(12) United States Patent
Fantner et al.

(10) Patent No.: US 11,112,426 B2
(45) Date of Patent: Sep. 7, 2021

(54) METHOD AND DEVICE OF USING A SCANNING PROBE MICROSCOPE

(71) Applicant: ECOLE POLYTECHNIQUE FEDERALE DE LAUSANNE (EPFL), Lausanne (CH)

(72) Inventors: Georg Ernest Fantner, Chavannes-près-Renens (CH); Jonathan David Adams, Lausanne (CH); Adrian Pascal Nievergelt, Préverenges (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 15/573,137

(22) PCT Filed: May 11, 2016

(86) PCT No.: PCT/IB2016/052701
§ 371 (c)(1),
(2) Date: Nov. 10, 2017

(87) PCT Pub. No.: WO2016/181325
PCT Pub. Date: Nov. 17, 2016

(65) Prior Publication Data
US 2018/0106830 A1    Apr. 19, 2018

(30) Foreign Application Priority Data

May 11, 2015 (WO) .................. PCT/IB2015/053452

(51) Int. Cl.
*G01Q 20/02* (2010.01)
*G01Q 10/04* (2010.01)
(Continued)

(52) U.S. Cl.
CPC ........... *G01Q 20/02* (2013.01); *G01Q 10/045* (2013.01); *G01Q 10/065* (2013.01); *G01Q 60/32* (2013.01)

(58) Field of Classification Search
USPC ........................................................ 850/1
See application file for complete search history.

(56) References Cited

U.S. PATENT DOCUMENTS 5,289,004 A * 2/1994 Okada .................. G01Q 10/065
250/423 F
5,723,775 A * 3/1998 Watanabe ............ G01Q 10/045
73/105
(Continued)

FOREIGN PATENT DOCUMENTS

WO WO2014033430 A1 3/2014

OTHER PUBLICATIONS

Lin; et al., "Robust Strategies for Automated AFM Force Curve Analysis—I. Non-adhesive Indentation of Soft, Inhomogeneous Materials", Journal of Biomechanical Engineering, Jun. 2007, vol. 129, pp. 430-440.*

(Continued)

*Primary Examiner* — Phillip A Johnston
(74) *Attorney, Agent, or Firm* — Andre Roland S.A.; Nikolaus Schibli

(57) ABSTRACT

A scanning probe microscope for high-speed imaging and/or nanomechanical mapping including a scanning probe comprising a cantilever with a tip at the distal end, and means for modulating a tip-sample distance separating the tip from an intended sample to be viewed with the microscope, the means for modulating being adapted to provide a direct cantilever actuation.

14 Claims, 15 Drawing Sheets

(51) Int. Cl.
*G01Q 60/32* (2010.01)
*G01Q 10/06* (2010.01)

(56) References Cited

U.S. PATENT DOCUMENTS

| | | | |
|---|---|---|---|
| 6,851,301 B2* | 2/2005 | Kim | G01Q 10/045 |
| | | | 73/105 |
| 6,871,527 B2 | 3/2005 | Hansma et al. | |
| 7,552,645 B2* | 6/2009 | Bargatin | G01Q 20/04 |
| | | | 73/104 |
| 8,458,810 B2* | 6/2013 | McConney | G01Q 60/58 |
| | | | 850/5 |
| 8,646,109 B2 | 2/2014 | Hu et al. | |
| 8,650,660 B2 | 2/2014 | Shi et al. | |
| 9,304,144 B2* | 4/2016 | Humphris | G01N 29/036 |
| 9,551,702 B2* | 1/2017 | Djakov | G01N 33/5438 |
| 9,874,582 B2* | 1/2018 | Humphris | G01Q 70/10 |
| 2011/0167524 A1* | 7/2011 | Hu | G01Q 20/00 |
| | | | 850/1 |

OTHER PUBLICATIONS

Brugger, J., et al. "Microlever with combined integrated sensor/actuator functions for scanning force microscopy." Sensors and Actuators A: Physical 43.1-3 (1994): 339-345.

Butt, Hans-Jürgen, Brunero Cappella, and Michael Kappl. "Force measurements with the atomic force microscope: Technique, interpretation and applications." Surface science reports 59.1 (2005): 1-152.

Cappella, Brunero, and Giovanni Dietler. "Force-distance curves by atomic force microscopy." Surface science reports 34.1-3 (1999): 15-3104.

Disseldorp, E. C. M., et al. "MEMS-based high speed scanning probe microscopy." Review of Scientific Instruments 81.4 (2010): 043702.

Enning, Raoul, et al. "A high frequency sensor for optical beam deflection atomic force microscopy." Review of scientific instruments 82.4 (2011): 043705.

Fantner, G. E., et al. "Use of self-actuating and self-sensing cantilevers for imaging biological samples in fluid." Nanotechnology 20.43 (2009): 434003.

Fantner, Georg E., et al. "DMCMN: In depth characterization and control of AFM cantilevers with integrated sensing and actuation." Journal of dynamic systems, measurement, and control 131.6 (2009): 061104.

Garcia, Ricardo, and Ruben Perez. "Dynamic atomic force microscopy methods." Surface science reports 47.6 (2002): 197-301.

Guo, Senli, et al. "Multifrequency imaging in the intermittent contact mode of atomic force microscopy: beyond phase imaging." Small 8.8 (2012): 1264-1269.

Han, Wenhai, S. M. Lindsay, and Tianwei Jing. "A magnetically driven oscillating probe microscope for operation in liquids." Applied Physics Letters 69.26 (1996): 4111-4113.

Herruzo, Elena T., Alma P. Perrino, and Ricardo Garcia. "Fast nanomechanical spectroscopy of soft matter." Nature communications 5 (2014): 3126.

International Search Report of PCT/IB2016/052701 dated Aug. 18, 2016.

Kim, K., & Lee, S. (2002). Self-oscillation mode induced in an atomic force microscope cantilever. Journal of applied physics, 91(7), 4715-4719.

Lozano, Jose R., and Ricardo Garcia. "Theory of phase spectroscopy in bimodal atomic force microscopy." Physical Review B 79.1 (2009): 014110.

Manalis, S. R., Minne, S. C., Atalar, A., & Quate, C. F. (1996). High-speed atomic force microscopy using an integrated actuator and optical lever detection. Review of Scientific Instruments, 67(9), 3294-3297.

Manalis, S. R., S. C. Minne, and C. F. Quate. "Atomic force microscopy for high speed imaging using cantilevers with an integrated actuator and sensor." Applied Physics Letters 68.6 (1996): 871-873.

Nievergelt, Adrian P., et al. "High-frequency multimodal atomic force microscopy." Beilstein journal of nanotechnology 5 (2014): 2459.

Parlak, Zehra, Qing Tu, and Stefan Zauscher. "Liquid contact resonance AFM: analytical models, experiments, and limitations." Nanotechnology 25.44 (2014): 445703.

Platz, Daniel, et al. "Interaction imaging with amplitude-dependence force spectroscopy." Nature communications 4 (2013): ncomms2365.

Proksch, Roger, and Dalia G. Yablon. "Loss tangent imaging: Theory and simulations of repulsive-mode tapping atomic force microscopy." Applied Physics Letters 100.7 (2012): 073106.

Rosa-Zeiser, A., et al. "The simultaneous measurement of elastic, electrostatic and adhesive properties by scanning force microscopy: pulsed-force mode operation." Measurement Science and Technology 8.11 (1997): 1333.

Sulchek, T., et al. "High-speed tapping mode imaging with active Q control for atomic force microscopy." Applied Physics Letters 76.11 (2000): 1473-1475.

Written Opinion of the International Search Authority dated Aug. 18, 2016 for PCT/IB2016/052701.

\* cited by examiner

METHOD AND DEVICE OF USING A SCANNING PROBE MICROSCOPE

CROSS REFERENCE TO RELATED APPLICATIONS

The present application is a United States national stage application of International patent application PCT/IB2016/052701 filed on May 11, 2016 designating the United States, and claims foreign priority to International patent application PCT/IB32015/053452 filed on May 11, 2015, the contents of both documents being herewith incorporated by reference in their entirety.

FIELD OF INVENTION

The present invention relates to scanning probe microscopy, in particular Atomic Force Microscopy (AFM), for the nano- and microscale characterization of materials.

STATE OF THE ART

The ability to measure mechanical properties (such as elastic modulus, adhesion, energy dissipation, etc) is very promising for materials science (polymer science, composite science, surface science) and life sciences (biomaterials, mechanobiology, cellular biology etc.). This has driven the rapid development of multiple AFM based mechanical property measurement techniques during the last few years. There are two different approaches to this topic:

1) force curve based methods; and
2) resonance based methods.

These approaches will now be detailed hereunder.

Force curve based methods In force curve based methods an AFM cantilever is brought into contact with the sample and a nanometer scale indentation is performed. From the deflection signal, the deflection sensitivity and the spring constant of the cantilever, it is possible to reconstruct the force-indentation curve. From this curve materials' properties such as Elastic modulus and energy dissipation may be extracted[1,3]. If one performs such a force curve in a grid-pattern one can reconstruct an image of a sample representing the mechanical properties spatially resolved. This mode is called force volume mode and is implemented in most commercial AFM instruments. This mode however is extremely slow since one force curve generally takes on the order of one second. This also practically limits the obtainable pixel resolution. To overcome this, Marti et al.[4] developed pulsed force mode where the cantilever is ramped in a sinusoidal pattern rather than a triangular one. This allows ramping at much higher speeds and thereby increases the imaging speed. Recently this approach has been picked up by several AFM manufacturers and different implementations of pulsed force mode have become commercially available (peak force tapping—PFT, Peak force quantitative nanomechanical mapping—PF-QNM (this is a trade-name and should be considered so throughout the present specification, denoting any force-curve based SPM method), QI-mode, HybriD-mode, . . . ). In addition to yielding mechanical properties of the sample some of these modes have the advantage that the feedback loop is much simpler and that automatic gain adjustments can be effectively implemented. This has made AFM much easier to use for inexperienced users. The exact control of the interaction duration can also be used for improved electrical properties measurements, magnetic properties measurement, etc.

Resonance Techniques

Alternatively to force curve based techniques there are techniques that extract the mechanical properties (or at least mechanical contrast) from the observables of a cantilever oscillating at one (phase imaging[5], loss tangent measurements[6]) or multiple Eigenfrequencies. If the cantilever oscillation is measured at more than one frequency these modes are called multi frequency modes. Typical implementations of this are bi-modal AFM[7], contact resonance[8,9], and inter-modulation methods[10]. In these methods the materials properties are calculated from a combination of dynamic observables of the cantilever such as resonance frequency, phase, amplitude, . . . . These methods have the advantage that they operate as fast as normal AFM and can be implemented on most AFM hardware.

DISCUSSION OF THE STATE OF THE ART

Both groups of measurement techniques have their own difficulties. The problem with force curve based techniques is that they require a fast and precise modulation of the tip-sample distance. This is usually done through the Z-scanner of the AFM, by either moving the cantilever-holder or the sample. Since the mass of the cantilever-holder or the sample is generally relatively large (several grams) it is difficult to move them reliably without exciting their resonance frequency at rates higher than 10 kHz. Multi frequency techniques do not have this problem, but they generally require multiple lock-in amplifiers and feedback loops which makes these techniques very difficult to use. The mechanical properties are also not directly measured but derived from the measurement of cantilever observables.

SUMMARY OF INVENTION

In a first aspect, the invention provides a scanning probe microscope for high-speed imaging and/or nanomechanical mapping. The microscope comprises a scanning probe comprising a cantilever with a tip at the distal end; and means for modulating a tip-sample distance separating the tip from an intended sample to be viewed with the microscope, the means for modulating being adapted to provide a direct cantilever actuation.

In a preferred embodiment the modulation means comprise photothermal means.

In a further preferred embodiment the modulaction means comprise electrothermal means.

In a further preferred embodiment, the microscope further comprises a readout light beam and a drive laser.

In a further preferred embodiment, the microscope further comprises a readout light beam and an electrothermal actuation.

In a further preferred embodiment, the microscope further comprises a non-optical cantilever detection mechanism and a drive laser.

In a further preferred embodiment, the microscope further comprises a non-optical cantilever detection mechanism and an electrothermal actuation.

In a further preferred embodiment, the microscope further comprises a single laser, which is adapted to act as the readout laser and as the drive laser.

In a further preferred embodiment the modulation means are piezoelectric, electrothermal, magnetic or electrostatic means.

In a further preferred embodiment the modulation means are adapted to provide a deformation of the whole part of the cantilever.

In a further preferred embodiment the modulation means are adapted to provide a partial deformation of the cantilever.

In a further preferred embodiment, the microscope further comprises the drive is configured to be adjusted to achieve a predefined motion.

In a further preferred embodiment, the microscope further comprises the predefined motion is a motion intended to correct the resulting known background.

In a further preferred embodiment the microscope is further configured to perform additional thermal bending of the cantilever to provide feedback motion for scanning.

In a further preferred embodiment the microscope is further configured to enable the feedback motion to be achieved by a combination of a piezo scanner and the bending of the cantilever by splitting a feedback signal by frequency such as to prevent the scan signal from exciting scanner resonances.

In a second aspect, the invention provide a method for using the scanning probe microscope as defined in any one of the previous claims and comprising a direct cantilever actuation for modulating a tip-sample distance separating the tip from an intended sample to be viewed with the microscope.

In a further preferred embodiment the direct cantilever actuation drives the probe into oscillation.

BRIEF DESCRIPTION OF THE FIGURES

The invention will be better understood through the description of example preferred embodiments and in reference to the drawings, wherein FIG. 1 contains an illustrations and graphs relating to cantilever motion in an Atomic Force Microscope and for photothermal actuation, according to prior art.

DESCRIPTION OF EXAMPLE EMBODIMENTS OF THE INVENTION

The invention makes use of direct cantilever actuation to perform the tip-sample distance modulation. In this case, the tip sample distance is preferably modulated through a deformation of the whole or part of the cantilever. In contrast, in conventional methods either the cantilever as a whole is displaced or the sample is displaced to modulate the tip-sample distance.

Here, we refer to "cantilever" as the probe consisting of a cantilever with tip at the distal end as is commonly used in the field, as well as other cantilever structures or MEMS devices that could be usable in scanning probe microscopy, such as but not limited to a membran[11] or a dual stage cantilever[12,13]. In a preferred embodiment a photothermal actuation of the cantilever is used.

Cantilever Motion and Photothermal Peak Force Deflection Signal

In Photothermal actuation, a laser beam is focused preferably on the base of the cantilever, which results in local heating. If the cantilever is asymmetric (for example through a metal coating), the local heating will result in a deflection of the cantilever through the bi-morph effect, see FIGS. 1A and B.

Figure 1:
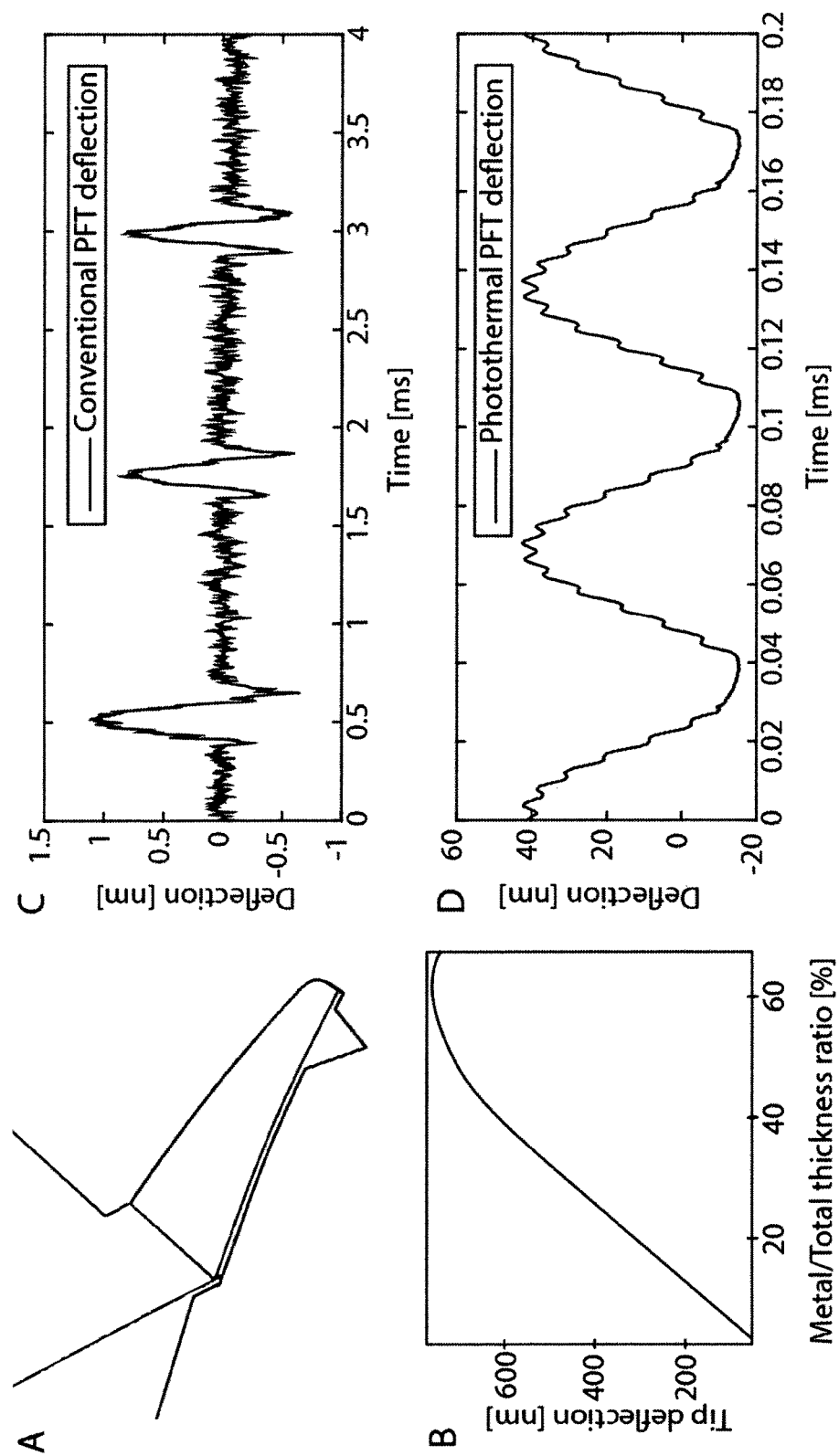

FIG. 1A show an FEA (Finite Element Analysis) simulation of cantilever bending due to drive laser focused at the base of the cantilever. FIG. 1B is a graph showing the cantilever tip deflection as a function of cantilever relative metal thickness.

Using this technique only the cantilever itself can be actuated, without having to move any larger mechanical components. This is easily possible to 100 kHz and beyond.

The resulting cantilever deflection signal from photothermally actuated PF-QNM (PT-PF-QNM) which is different from the standard PF-QNM signal, since in the PT-PF-QNM the cantilever is both actuator and displacement/force sensor—see FIG. 1C vs. D.

FIG. 1C is a graph of a conventional PFT cantilever deflection signal. FIG. 1D is a graph illustrating a photothermal PFT cantilever deflection signal.

The fact that only the cantilever itself can be actuated is not a problem, since PF-QNM uses a method to subtract parasitic cantilever motion such as viscous drag forces. This background subtraction incidentally also removes the actuator-sensor cross-talk in PT-PF-QNM, and the resulting measurement data is equally valid for PT-PF-QNM as for traditional PF-QNM.

Figure 2:
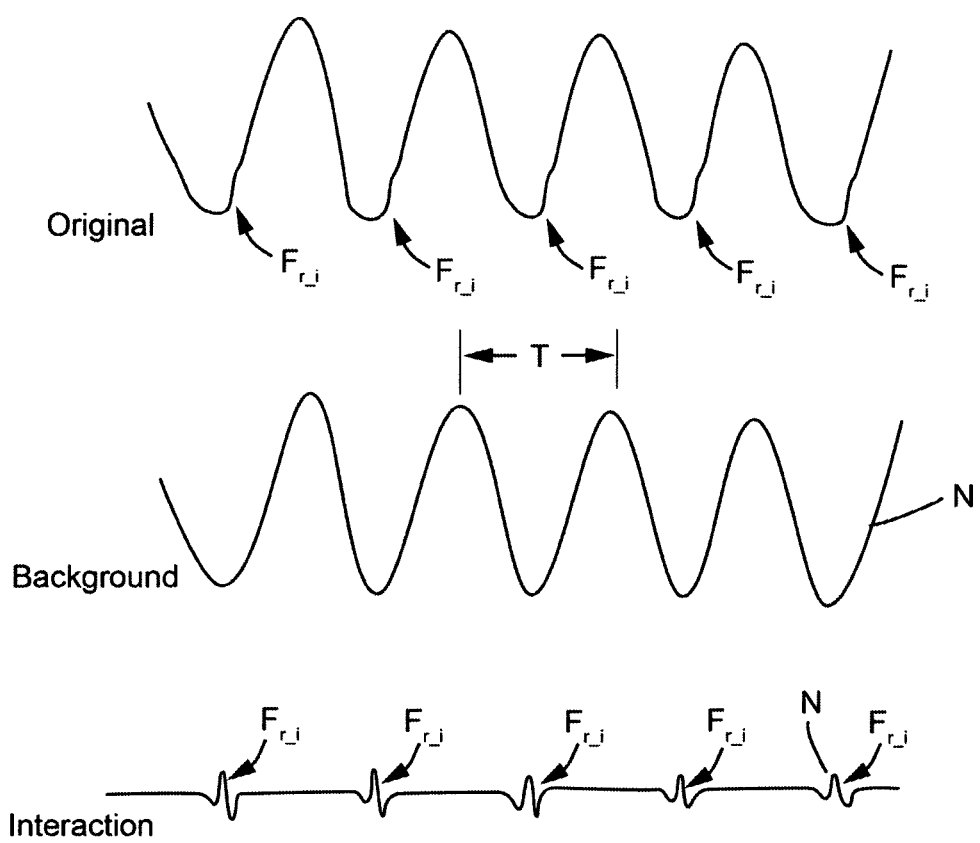
FIG. 2 contains graphs pertaining to an extraction of force interaction from original data measured on a photodetector in an AFM according to prior art.

In FIG. 2, the cantilever response is schematically shown during operation as the "original" signal. The real tip-sample interaction force is only at the $F_{r\_i}$ portion, which is buried within the background of parasitic cantilever or probe motion. The background will be in part due to the actuated deflection of the cantilever to generate tip-sample distance modulation. Other sources of background could be mechanical coupling resonances from the AFM system, or cantilever response from its environmental medium, or laser interference as the cantilever moves relative to the sample. By subtracting the background from the original data, the magnitude of the interaction force is obtained.

Use of Photothermally Actuated PF-QNM for High-Speed AFM Operation

In recent years two main trends have pushed the AFM market:
1) high-speed AFM, and
2) Nanomechanical characterization.

The development of PF-QNM has added a third trend, which is towards ease of use with the goal of fully automated AFM imaging. Peak force-QNM (and the simplified version peak force tapping—PF-tapping or PFT) has gained popularity due to the much simple feedback situation in PF-QNM than in conventional tapping-mode AFM (which is currently the most widely used AFM mode). Many users are willing to trade the imaging speed for ease of use. The herein described devices and methods according to the invention allow to increase the imaging speed of PF-tapping by one order of magnitude, and potentially surpass the imaging speeds of current generations of general purpose high-speed AFMs (HS-AFMs).

The invention will be better understood through the following description of example illustrated by Figures as appropriate.

The invention is of course not limited to this example.

A review of the peak force tapping mode of imaging is described in US patent publications U.S. Pat. No. 8,646,109 B2 and U.S. Pat. No. 8,650,660 B2 and is incorporated by reference herein. FIG. 3 shows an AFM 100 operable in PT-PFT Mode—photo-thermal peak force tapping mode—that includes a probe 102 mounted in a probe holder 108 and having a cantilever 104 supporting a tip 106. In the preferred embodiment, tip-sample separation is modulated according to the intensity of a light beam "DL" focused at the base of the cantilever 104. However, other methods of direct cantilever deflection actuation (such as piezoelectric, electro-thermal, magnetic, or electrostatic actuation) are applicable to the method of operation.

During operation, probe deflection is measured by bouncing a light beam "L" off the back of the probe and toward a detector 114, such as a four quadrant photodetector. The deflection signal is then transmitted to an analog to digital converted 103. The digitized signal is used for maintaining the tip-sample force low while operating the AFM at high speed.

Figure 3A:
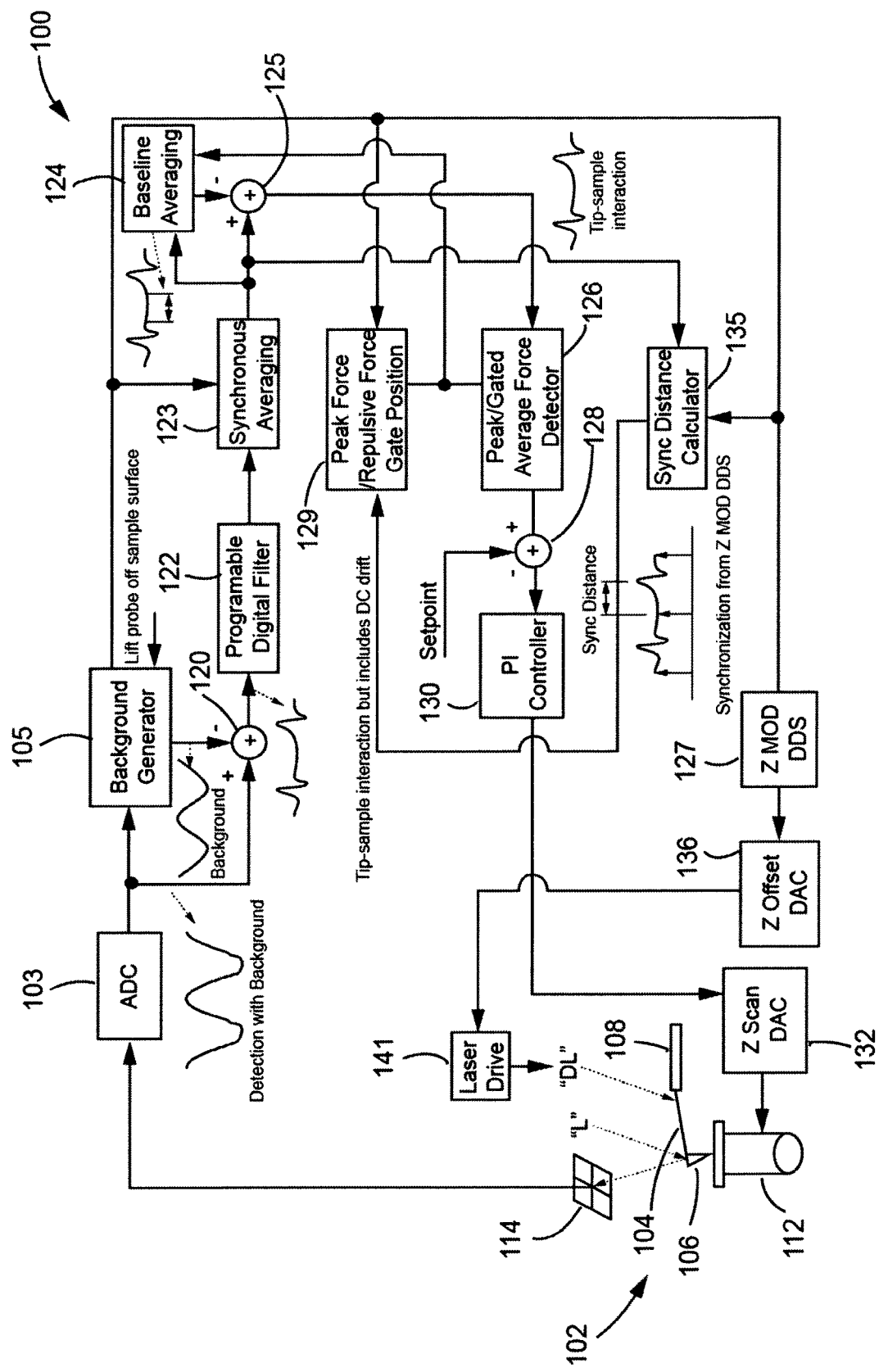
FIG. 3a contains a schematic illustration of an AFM according to an example embodiment of the invention.

In the embodiment shown in FIG. 3a, probe deflection without tip-sample interaction is transmitted to a background generator 105. The background generator will create a periodic waveform corresponding to the background signal when the tip and sample are not interacting. This waveform can be generated by a DDS (Direct Digital Synthesis function generator) whose amplitude and phase are determined by a lock-in amplifier, and whose input is the background signal. This waveform can also be generated by synchronously averaging multiple cycles of the background with the help of a synchronization signal. A comparator circuit 120 processes the total deflection signal by subtracting the background signal so as to generate a signal representative of tip-sample interaction force independent of the parasitic background (as illustrated in FIG. 2). This signal is then fed through a digital filter 122 that processes the post-subtraction deflection error to limit the processed ring-down oscillation of the lever to a number of selected cycles. The filtered signal is transmitted to synchronous averaging circuit 123 to further increase the signal to noise ratio. By averaging data in the non-interaction region with the help of synchronization, a baseline is determined from baseline averaging circuit 124. A comparator circuit 125 processes the total deflection signal by subtracting the baseline signal so as to generate a signal representative of tip-sample interaction force with no cantilever DC drift. This signal is further transmitted to a force detector 126. Sync Distance calculator 125 determines the phase shift between the deflection and the Z modulation DDS (Block 127) that provides the drive and synchronization control in the form of a time delay. Peak force or repulsive force gate position generator 129 generates the timing signal for force detector 126, with the help of the synchronization marker and synchronization time distance. Force detector 126 analyses the output of summation circuit 125 by either identifying the repulsive peak force or averaged repulsive force within the gated region. Again, by operating force detector 126 this way so force control can be triggered on a selected part of the force curve (e.g. repulsive force region), higher sensitivity is achieved by reducing the effect of the attractive force between the sample and tip. Moreover, signal to noise ratio is improved by excluding noise from the gate of detector 126. The gated repulsive force is then compared to an appropriate setpoint (Block 128), and an error signal is generated and transmitted to a control block (e.g. a PI controller 130). The control signal is then converted to analog (converter 132) and applied to the Z-piezo 112 for actuating the z position to maintain essentially steady state interaction between the tip and sample.

For generating the tip-sample distance modulation, the synchronization signal from Block 127 is converted to analog with converter 136 and applied to laser drive circuit 141 which modulates the intensity of the light beam "DL".

Figure 3B:
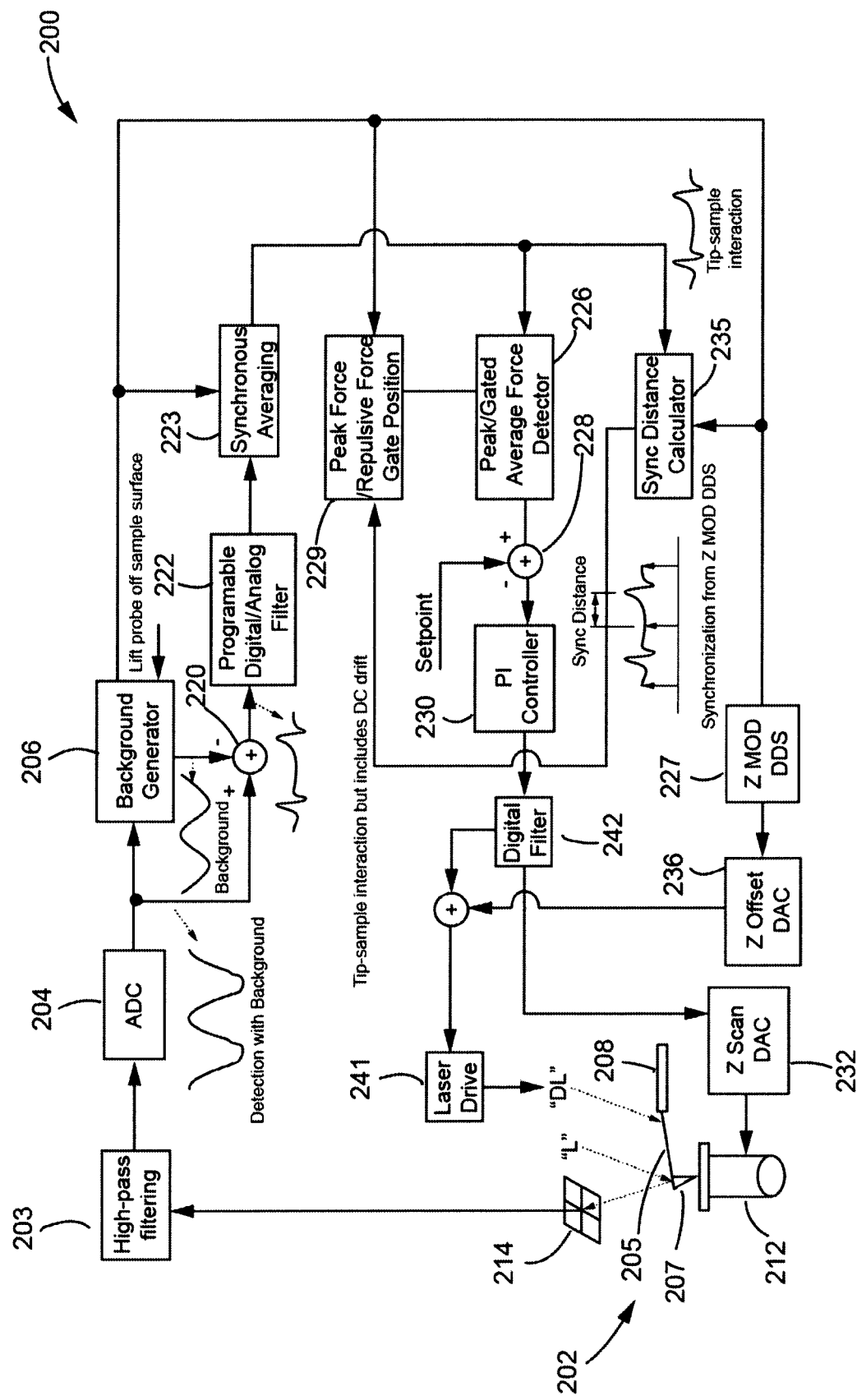
FIG. 3b contains a schematic illustration of an AFM according to another example embodiment of the invention.

In the embodiment shown in FIG. 3b, the probe deflection is passed to a high-pass filter 203 to remove deflection signal DC drift. The probe deflection without tip-sample interaction is transmitted to a background generator 206. The background generator will create a periodic waveform corresponding to the background signal when the tip and sample are not interacting. This waveform is generated by averaging the measured background after lifting the probe off the sample surface while synchronizing to the output period. A comparator circuit 220 processes the total deflection signal by subtracting the background signal so as to generate a signal representative of tip-sample interaction force independent of the parasitic background (FIG. 2). This signal is then fed through a digital or analog filter 222 that processes the post-subtraction deflection error to limit the processed ring-down oscillation of the cantilever. The filtered signal is transmitted to synchronous averaging circuit 223 to further increase the signal to noise ratio. This signal is further transmitted to a force detector 226. Sync Distance calculator 235 determines the phase shift between the deflection and the Z modulation DDS (Block 227) that provides the drive and synchronization control in the form of a time delay. Peak force or repulsive force gate position generator 229 generates the timing signal for force detector 226, with the help of the synchronization marker and synchronization time distance. Force detector 226 analyses the output of summation circuit 225 by either identifying the repulsive peak force or averaged repulsive force within the gated region. Alternatively the force detector 226 extracts the maximum force in a bounded region of the interaction. Again, by operating force detector 226 this way so force control can be triggered on a selected part of the force curve (e.g. repulsive force region), higher sensitivity is achieved by reducing the effect of the attractive force between the sample and tip. Moreover, signal to noise ratio is improved by excluding noise from the gate of detector 226. The gated repulsive force is then compared to an appropriate setpoint (Block 228), and an error signal is generated and transmitted to a control block (e.g. a PI controller 230). The control signal is then converted to analog (converter 232) and applied to the Z-piezo 212 for actuating the z position to maintain essentially steady state interaction between the tip and sample. Alternatively the signal is split into high and low frequency components in the digital filter 242, with a crossover frequency well below the first axial resonance of the piezo scanner. The low-frequency components are sent to the piezo and the fast components are after frequency compensation added to the drive laser to achieve high-speed imaging by dual actuation. This prevents the excitation of the scanner resonance and improves the topography feedback bandwidth by about an order of magnitude.

For generating the tip-sample distance modulation, the synchronization signal from Block 227 is converted to analog with converter 236 and applied to laser drive circuit 241 which modulates the intensity of the light beam "DL".

Figure 3C:
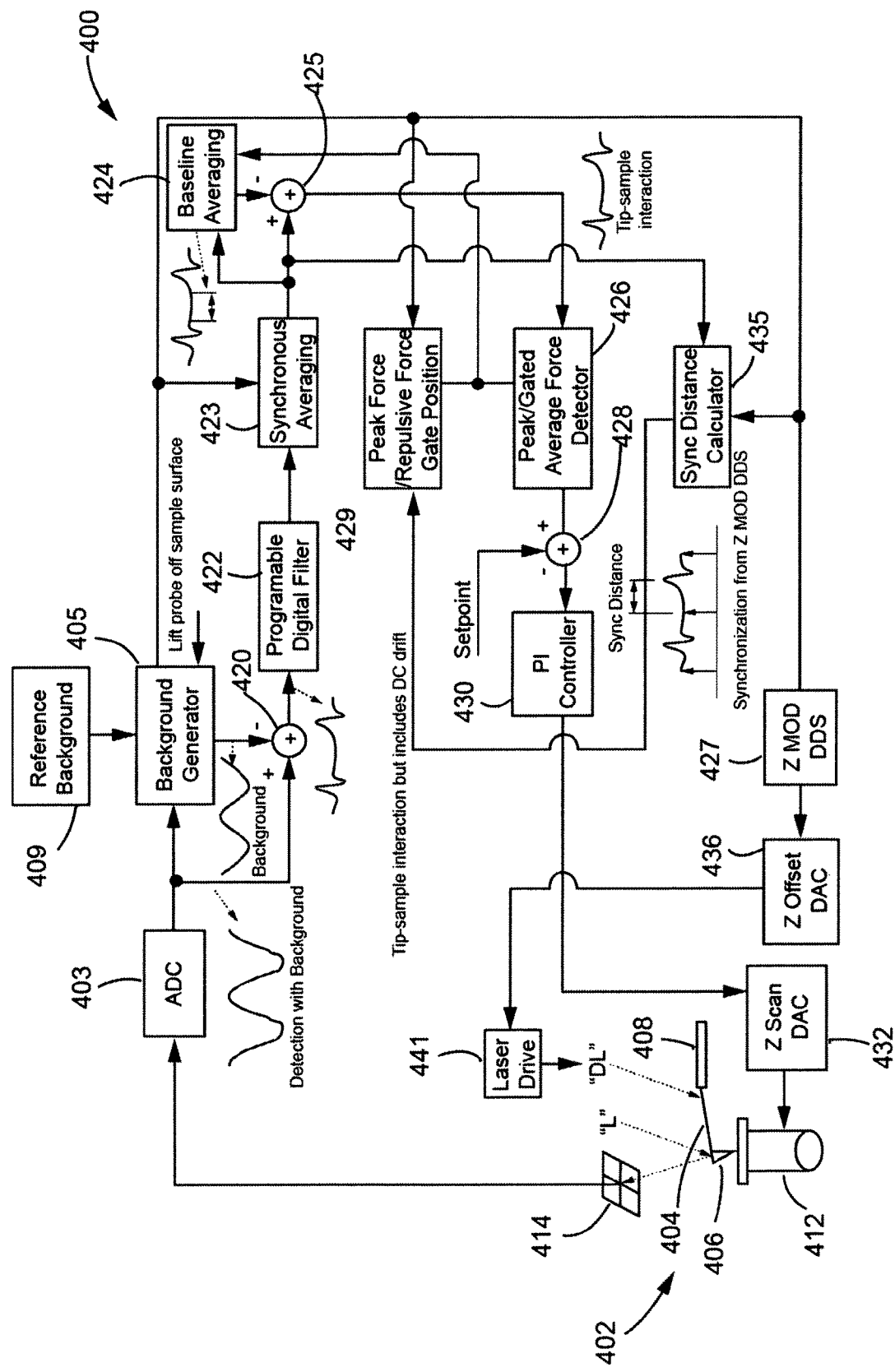
FIG. 3c contains a schematic illustration of an AFM according to another example embodiment of the invention wherein a background generator changes its output to generate a reference background which may then be subtracted.

The embodiment in FIG. 3c shows an alternate means of operation by operating the drive laser "DL" in a way that creates a known and controlled background motion 409. Instead of recording the parasitic background (arising from effects such as interference or drag) and subtracting it from the force curves, the controller analyses the parasitic influences, and adjust the drive signal such that the cantilever performs the desired motion (for example but not limited to a sine wave). The desired motion can then be subtracted from the cantilever deflection waveform 403 when needed to to recover the interaction.

Figure 4:
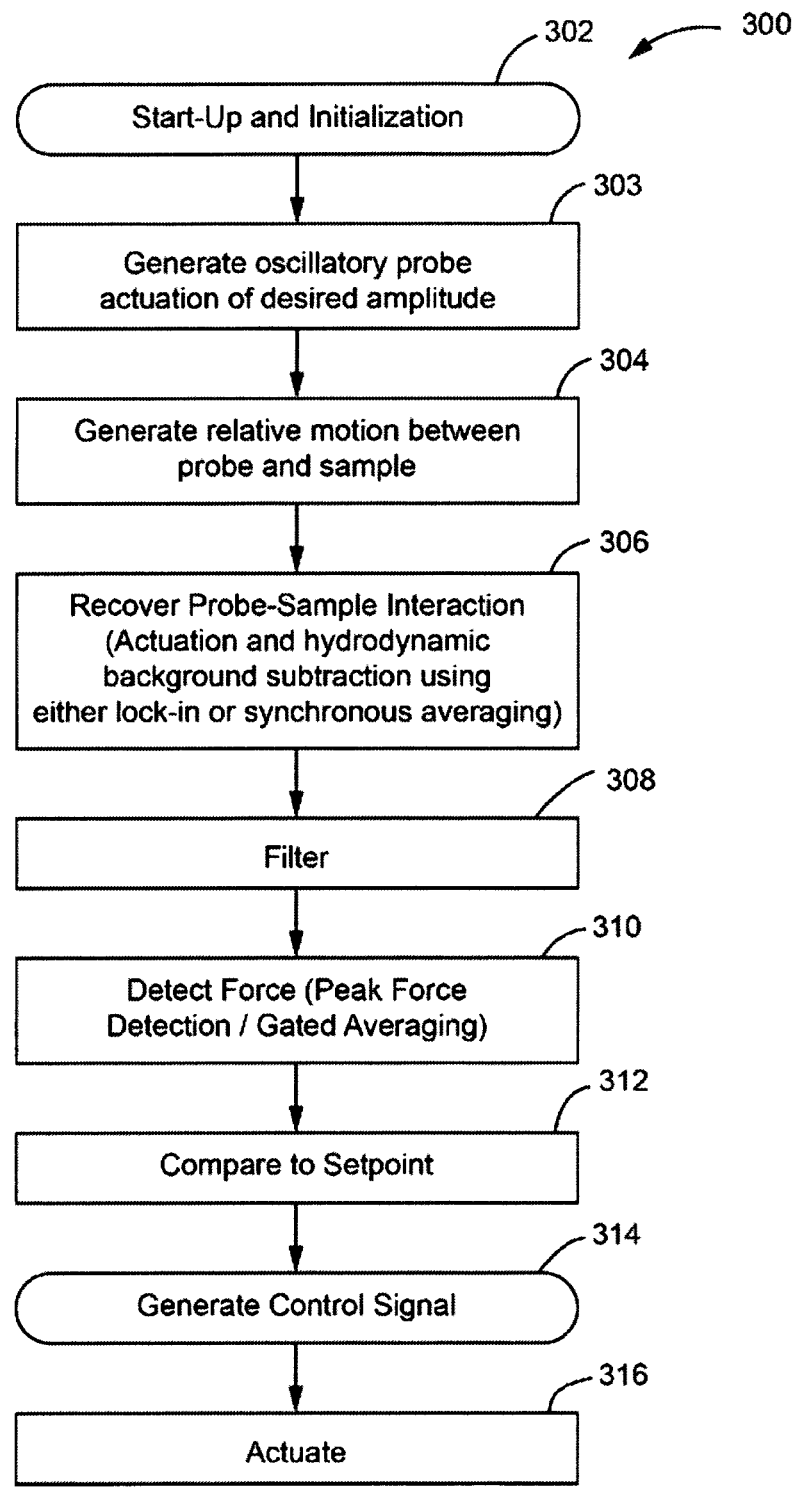
FIG. 4 illustrates a flowchart corresponding to a method of operating an AFM according to PT-PFT mode, according to an example embodiment of the invention.

In FIG. 4, a method 300 of operating an AFM according to PT-PFT Mode is shown. After a setup and initialization Block 302 (no tuning required), the probe is driven into oscillation (Block 303, see also FIG. 5) using direct cantilever actuation (preferably photothermal actuation) and the actuation parameters are adjusted to give the desired actuation amplitude. Here, the amplitude may be calibrated in physical units by first measuring the deflection sensitivity of the cantilever. This sensitivity can be measured by moving the Z-actuator by a known distance, bringing the tip and surface into contact, and recording the resulting probe deflection. Preferably, in Block 304, relative XY motion between the probe and sample is initiated (scanning).

Motion of the probe is then detected; in particular, probe deflection is detected and transmitted to the converter for further processing. In Block 306, the method then operates to recover probe-sample interaction as described above, preferably performing subtraction of both the actuation and hydrodynamic background using either lock-in amplification, or more preferably, synchronous averaging of the deflection. After filtering the output in Block 308 (e.g. selecting a number of cycles of ringdown to process), the method detects the force (peak force detection/gated averaging), preferably using the repulsive region of the force curve, in Block 310. In Block 312, the force is then compared to the setpoint force, set according to the user's desired interaction force. The Z-actuator responds to the control signals in Block 316 to adjust tip-sample separation and maintain the setpoint force, with the control signals being used to generate an image of the sample.

Figure 5:
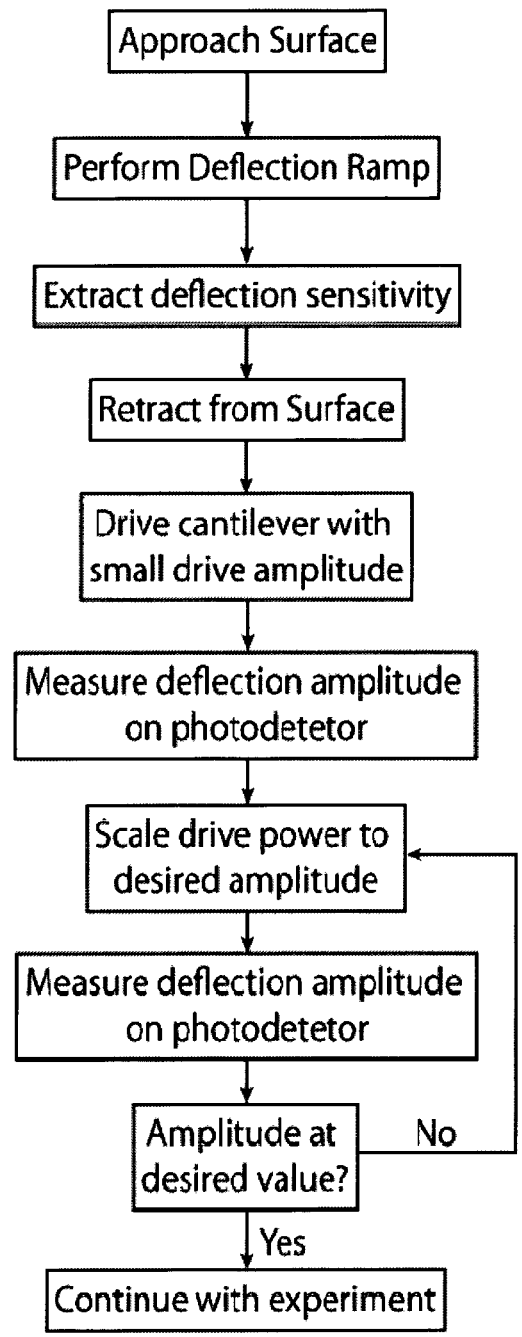
FIG. 5 contains a flowchart illustrating a method of setting a desired peak force tapping amplitude, according to an example embodiment of the invention.

The method of setting the desired peak force tapping amplitude is shown in FIG. 5. The surface is approached using any conventional method of operation. A deflection ramp is performed to calibrate the detector sensitivity. The tip is retracted to allow for free cantilever movement. The thermal drive is engaged to obtain an oscillation of the cantilever. The amplitude is determined from the photodiode signal using the previously acquired deflection sensitivity. The drive amplitude is scaled until desired amplitude is reached. The amplitude could also be set by performing a frequency sweep of the drive, and fitting the result to get a frequency-dependent scaling factor for the amplitude drive. Reconstruction of Force Distance Curve Taking into Account the Different Deflection Sensitivities when the Cantilever Tip is in Free Air and when it is in Contact.

Figure 6:
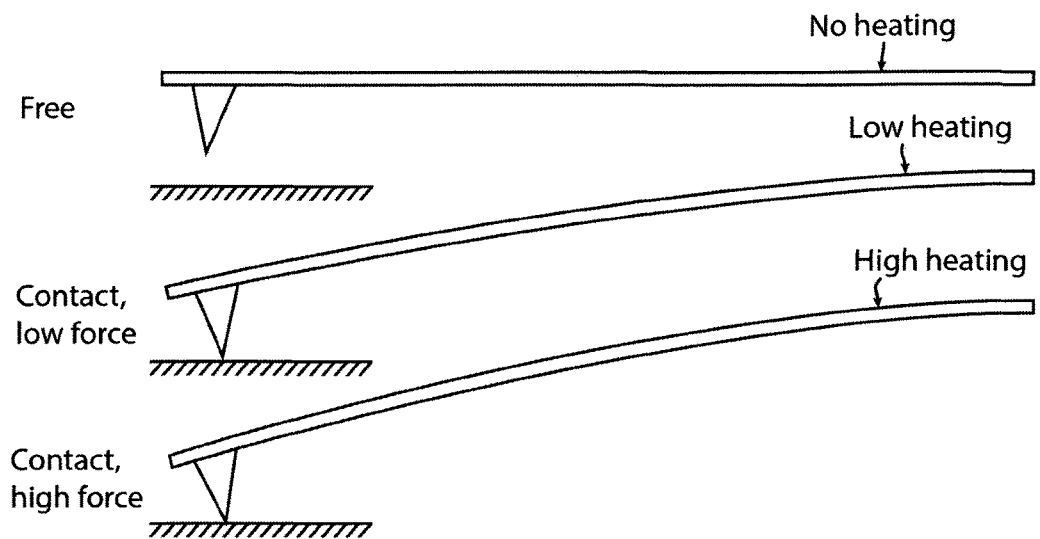
FIG. 6 contains illustrations of an AFM device showing the effect of deflection mismatch upon transition from clamped-free to clamped-pinned situation.

Since in PT-PFT the cantilever acts as sensor and as actuator, the actuation of the cantilever is inherently embedded in the deflection signal. In addition, since the actuation of the tip motion occurs at a different place (the base of the cantilever) than the detection of the tip (detected through the measurement of the cantilever angle at the tip) the coupling of the actuation into the detection signal is not always constant. In particular it depends on if the tip touches the surface or not. When the tip is in free air, the cantilever follows the bending profile of a single sided cantilever beam with induced asymmetric stress. Once the surface is in contact, the cantilever bending line is that of a beam supported on one side with a fixed support and on the other with a sliding pin support. FIG. 6 illustrates the different bending lines when using directly actuated cantilevers for PFT, showing a deflection mismatch upon transition from clamped-free to clamped-pinned beam situation. The deflection angle at the tip will increase linearly with heating (clamped-free beam) until the cantilever tip makes contact with the surface (from that point on clamped-pinned beam). In contact with a surface the bendline of the cantilever does not continue to evolve the same way as it would if it were not in contact. With increased heating the bending at the cantilever base and the force at the tip increase, and the deflection angle at the tip increases a small amount. To properly extract the actual force curve different deflection sensitivities should be used for the range where the cantilever tip is in contact with the surface and when the cantilever tip is not in contact with the surface.

Figure 7:
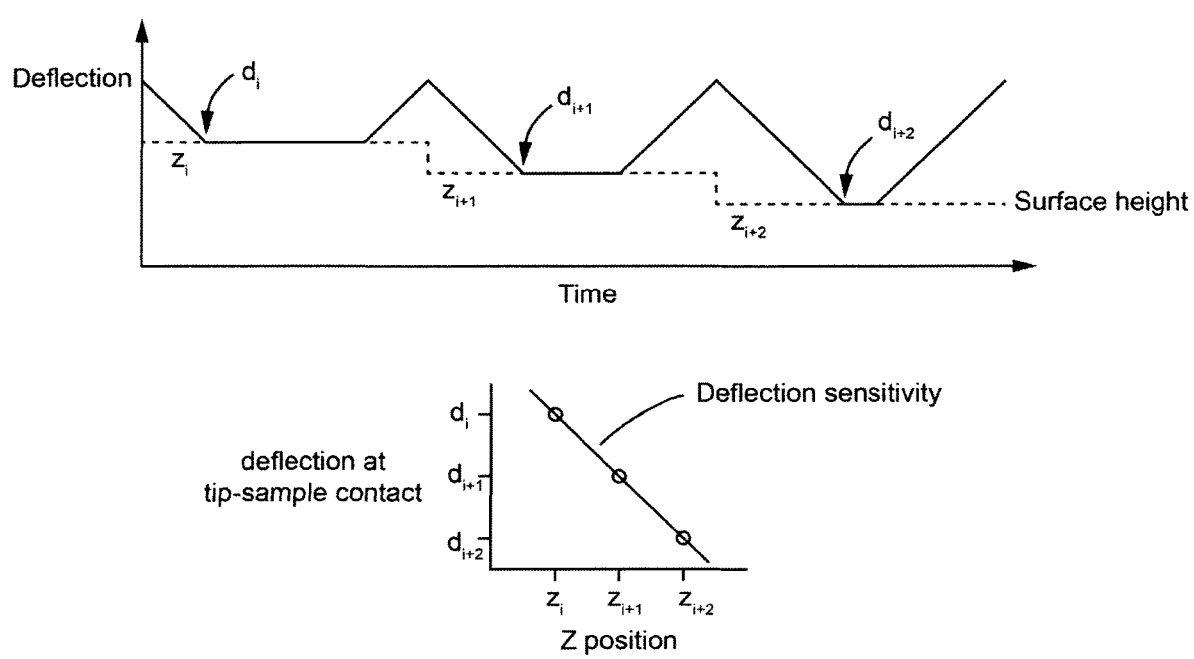
FIG. 7 contains graphs pertaining to a photothermal deflection sensitivity measurement procedure.

This additional correction can be performed as an additional step or as part of block 306 in FIG. 4. The deflection sensitivity due to photothermal bending may be calculated as illustrated in FIG. 7. The cantilever may be deflected photothermally until the deflection at the point of contact $d_i$ for a known surface height $z_i$ can be determined. The known surface height can be changed to a new value and the procedure repeated a minimum of 2 but any number of times. A plot of the deflection at tip-sample contact versus the known surface heights can be used to extract the deflection sensitivity under photothermal bending.

Alternatively to the commonly used optical lever deflection system an interferometric detection scheme could be used. This would enable the absolute measurement of the cantilever deflection due to cantilever actuation or cantilever-sample interaction. The photothermal actuation can be either coupled through the interferometer or via a different light path.

Alternatively to optical detection methods to measure the cantilever deflection one can also use other methods such as strain sensing methods (including but not limited to piezoresistive, piezoelectric, etc). The above described correction may or may not be applicable to these situations. Depending on the situation a different correction procedure may be required before or as part of block 306.

Optimization of Cantilevers for PT-PFT

Cantilevers can be made with dedicated coatings for high bimorph effect and large heat dissipation for high-bandwidth actuation. For the current tests, we used commercial cantilevers that are not specifically optimized for photothermal actuation. This limits the actuation efficiency and thereby the ultimate bandwidth that can be achieved. Optimization of the cantilever could focus on aspects such as:

1) improving the actuation efficiency when the laser is on,
2) ensuring sufficiently fast heat dissipation when the laser is off, and
3) optimize the spring constant for specific applications.

A high photothermal drive efficiency requires a combination of a high bimorph effect (for example by using materials with very different thermal expansion coefficients, or by optimizing the relative layer thicknesses) with a coating that absorbs sufficient amounts of light to locally heat the cantilever. To achieve high bandwidth the stored thermal energy in the cantilever has to dissipate quickly for the cantilever to return again to its original position. The amount of cantilever deflection that can be achieved due to the photothermally induced stress depends on the elastic modulus of the material and the spring constant of the beam.

Figure 8:
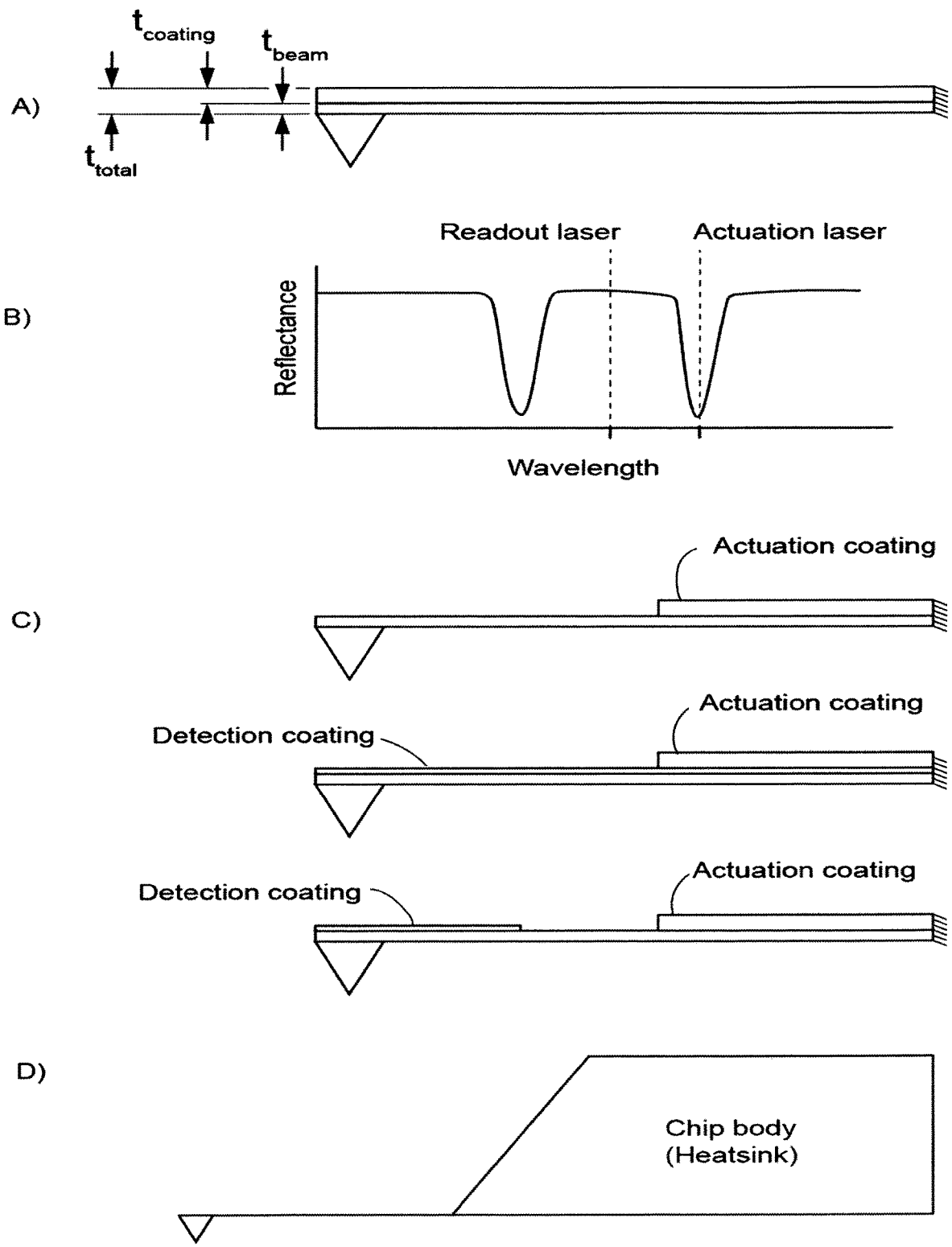
FIG. 8 contains successive illustrations aiming at showing possible ways to optimize the cantilever for PT-PFT.

Optimization of cantilever properties for PT-PFT performance could take place via strategies such as those illustrated in FIG. 8. Typically in cantilever design, the thickness of the optically reflective coating $t_{coating}$ is kept to a minimum value in order to reduce the effect of this coating on the mechanical properties of the cantilever. However, the coating thickness or material could be adjusted to instead optimize the deflection of the cantilever due to photothermal actuation as shown in FIG. 8(A). FIG. 1(B) shows simulation results for the expected tip deflection under constant photothermal actuation for a changing ratio between the coating thickness $t_{coating}$ and the cantilever beam thickness $t_{beam}$ while maintaining a constant total thickness $t_{total}$. The coating could also be designed such that it reflects strongly at the readout laser wavelength and absorbs at the actuation laser wavelength (FIG. 8(B)). The coating may also be adjusted such that it extends over only a portion of the cantilever area, as shown in FIG. 8(C). The coating may extend over only a portion of the cantilever (if no reflective coating for deflection detection is needed) or have a spatial extent that is separate from the coating for deflection detection. These different implementations could increase the deflection while minimizing the impact of the actuation coating on the mechanical properties of the cantilever. A further optimization could take place in the chip body (shown in FIG. 8(D)) which acts as a heat-sink for the cantilever. Upon lowering the intensity of the actuation light intensity, in order for the cantilever to revert to equilibrium deflection, the heat in the cantilever must be dissipated, either into the environment surrounding the cantilever or into the chip body. The rate at which this occurs could influence the frequency response of the cantilever actuation. The thermal resistance of the chip body could be improved either through mechanical design or by making the chip body out of a material with higher thermal conductivity or a combination of both.

Figure 9:
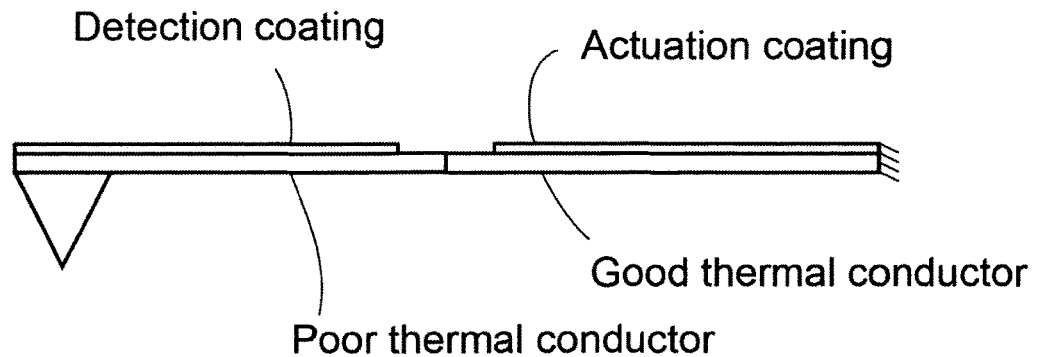
FIG. 9 illustrates possibilities for minimizing an unwanted heating of the tip in an AFM.

FIG. 9 shows a way of minimizing the unwanted heating of the tip by making the cantilever out of both a poor thermal conductor towards the tip and a good thermal conductor towards the base to sink the heat to the base.

Physical Implementation and Practical Testing

Figure 10:
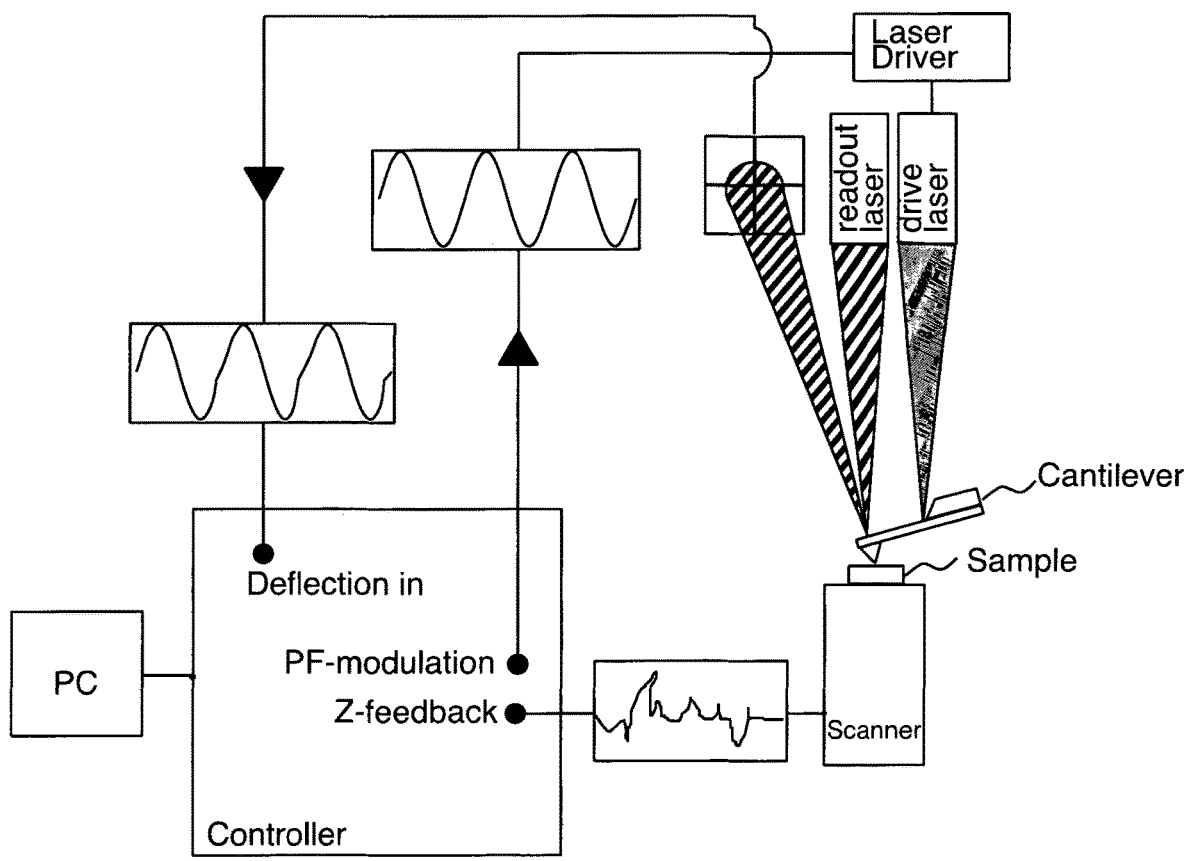
FIG. 10 schematically illustrates a simplified experimental for PT-QNM using a Nanoscope controller.

The inventors have tested the concept using a home built AFM-head with photo-thermal actuation[14] in conjunction with a custom Nanoscope PF-QNM workspace provided by Bruker Nano Inc. The schematic of the experimental setup is shown in FIG. 10.

Figure 11:
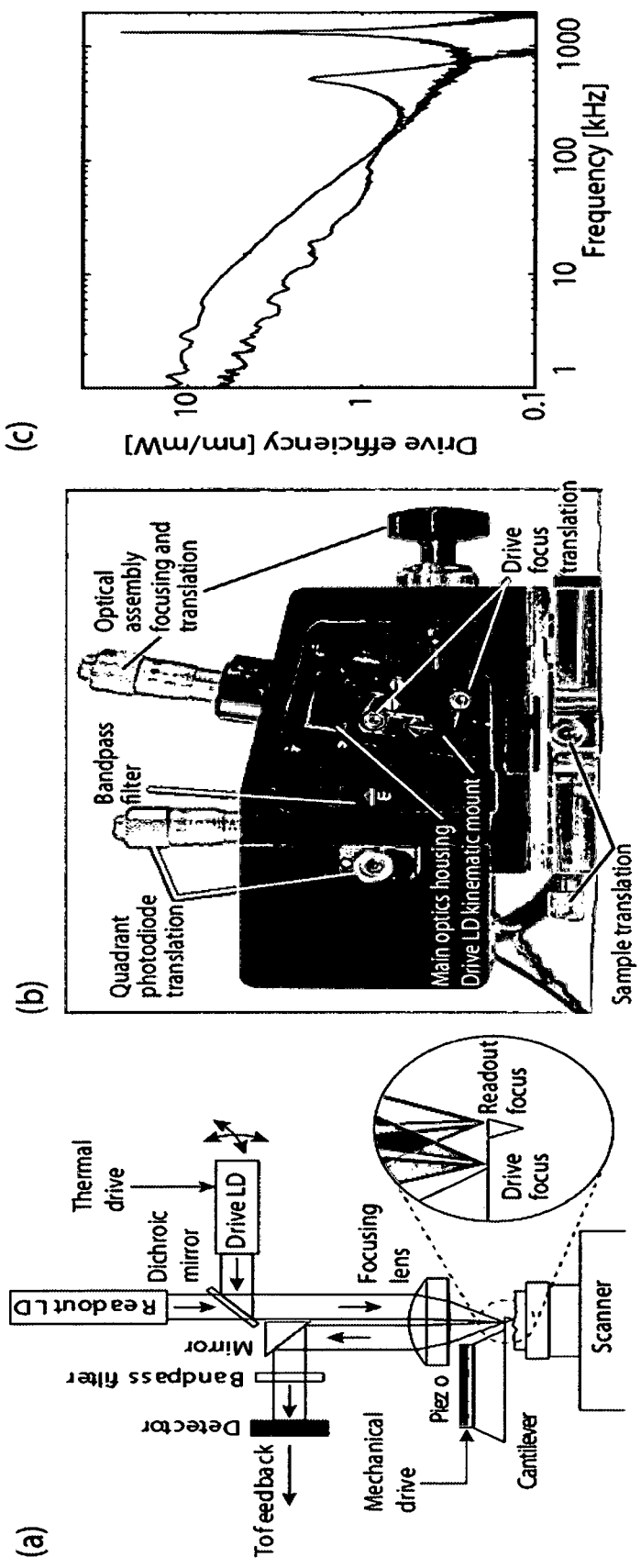
FIG. 11 contains an illustration of a photothermal peak force tapping using a custom built AFM head with dual laser setup and a graph of bandwidth measurements.

Advantageously two laser beams are focused on the cantilever, one to detect the cantilever deflection (focused near the tip end of the cantilever) and one to perform the actuation (focused near the base of the cantilever). The detection laser is either powered continuously or with a frequency much higher than the first resonance frequency of the cantilever. The actuation laser is powered with a varying intensity corresponding to the trajectory used for the PF-modulation. This modulation can either be done in current control mode or in power control mode, with or without an additional high frequency modulation. By simple rerouting the signal that is originally intended for the Z-modulation Piezo into the modulation power input of our photothermal head the cantilever can be modulated to frequencies of around 100 kHz (see FIG. 11—photothermal peak force tapping using a custom build AFM head with a dual laser setpup in 11(a) and 11(b), and bandwidth measurement for photothermal excitation in air and fluid for a Fastscan-A cantilever in 11(c)).

The reflected light from the actuation laser is blocked from entering the detector (position sensitive device, PSD) by an optical filter. The readout laser passes that filter and the position at which the readout laser hits the PSD is transformed into an electronic signal. This signal is then used for the deflection input into the peak-force AFM controller.

Figure 12:
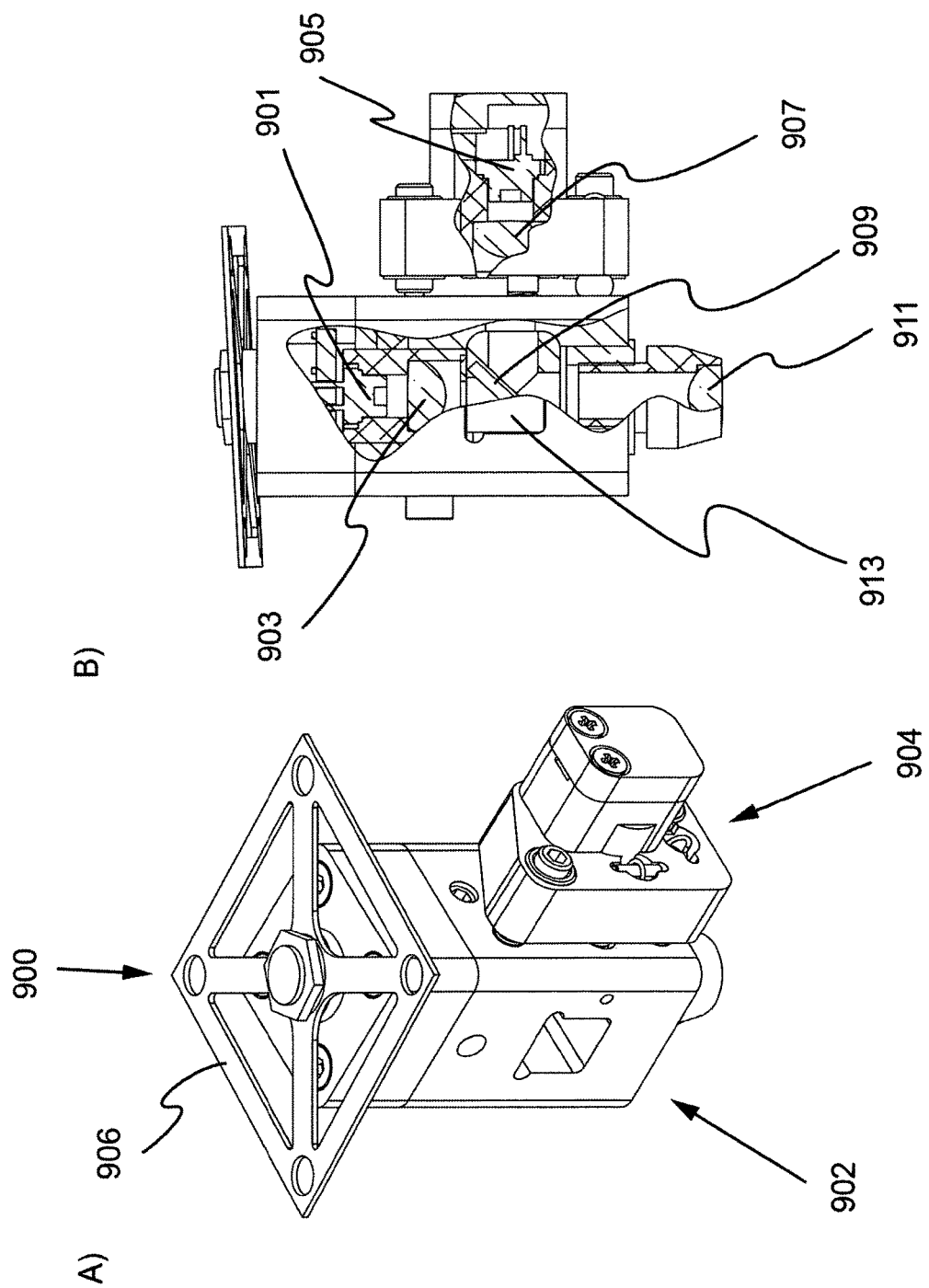
FIG. 12 shows details of a dual-laser optics block according to an example embodiment of the invention.

FIG. 12 shows a detail of the preferred embodiment for the optical beam readout and photothermal excitation. An optics block 900 consists of a main housing 902 and secondary housing 904 mounted onto main housing via an adjustable kinematic mount. The adjustment can alter the angle of the secondary housing relative to the main housing along two axes of rotation. The optics block is mounted into the AFM head housing (FIG. 11(b)) via a flexure plate 906. This architecture permits the position of the drive laser relative to the readout laser to be held constant upon translation of the readout laser. FIG. 12(B) shows a detail of the optical components within the optics block. Output of a readout laser diode 901 is collimated by a lens 903. Output of a second drive laser diode 905 is collimated by a second lens 907. The collimated output of both lasers is combined by the dichroic mirror 909 and both light beams are incident on one region of the focusing lens 911 (FIG. 12(a)). After reflecting from the cantilever, the light beams pass through a different region of the focusing lens 911 and are reflected out of the optical block by a right angle mirror 913 towards a bandpass filter and PSD (FIG. 12(a) and FIG. 12(b)).

The concept of a unified optics block and the basic optical architecture are described in U.S. Pat. No. 6,871,527 B2. The use of a secondary housing on an adjustable kinematic mount for photothermal actuation is described in reference[14].

Results

Figure 13:
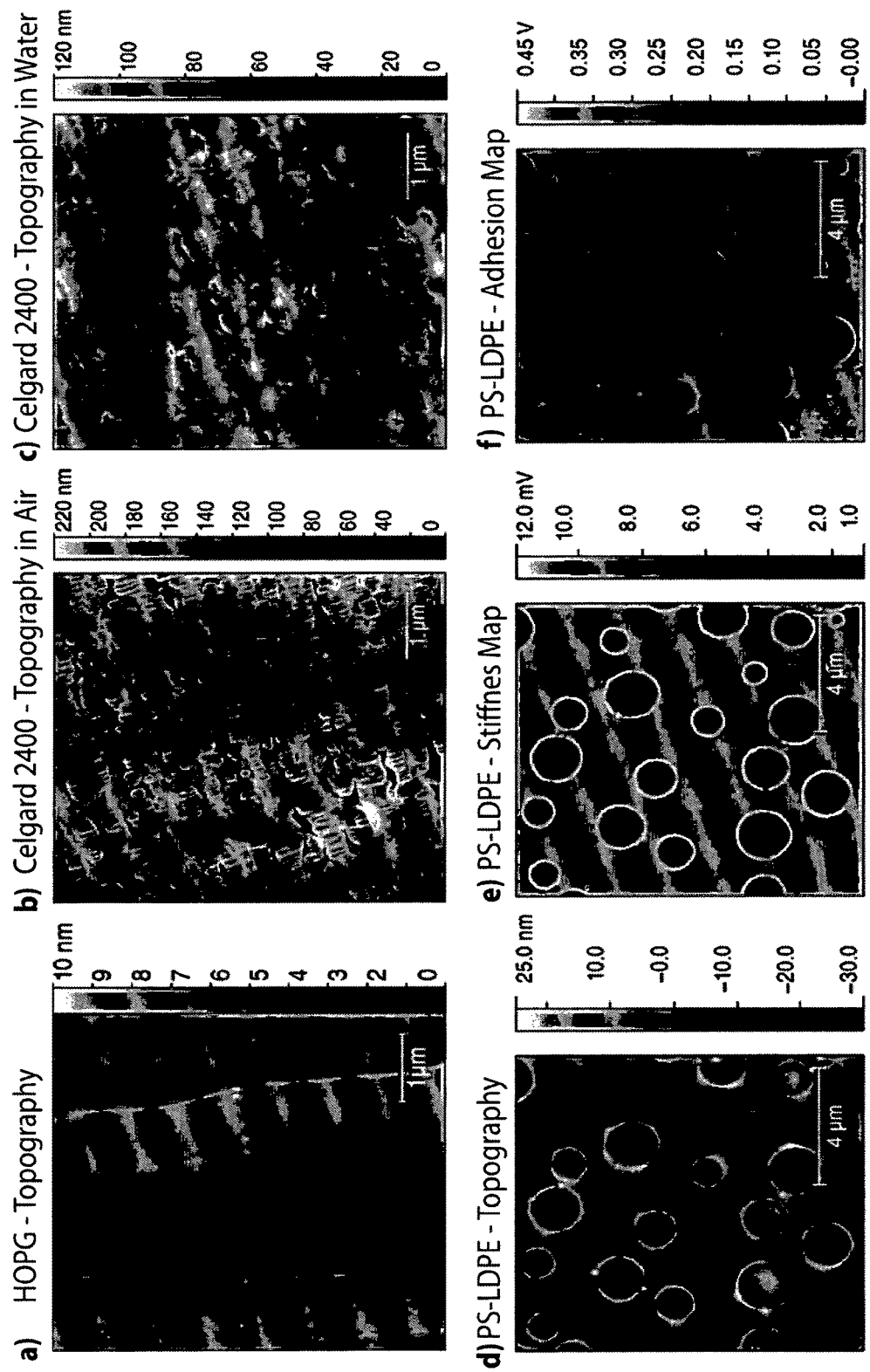
FIG. 13 contains a plurality of example AFM images taken in photothermal peak force tapping (PT-PFT) mode.

Several standard AFM samples were imaged to demonstrate the performance of the technique. FIG. 13 shows examples of highly ordered pyrolythic graphite (HOPG), a Celgard 2400 membrane, and a polymer blend of polystyrene and low density polyethylene (PS-LDPE). All samples were imaged at 16 kHz PFT-rate, FIG. 13.

FIG. 13(a): Highly Ordered Pyrolitic Graphite (HOPG) has a low topography and shows low height noise operation;

FIG. 13(b): Celgard 2400 membrane for lithium polymer batteries is used to show the disruption free imaging of the delicate vertical fibrils;

FIG. 13(c): Celgard 2400 is imaged in water, demonstrating the capability to operate in fluid;

FIG. 13(d): Polystyrene-Low Density Polyethylene (PS-LDPE) forms domains with different mechanical properties. PTPFT is used to simultaneously measure topography;

FIG. 13(e): stiffness; and

FIG. 13(f): adhesion of the surface.

Figure 14:
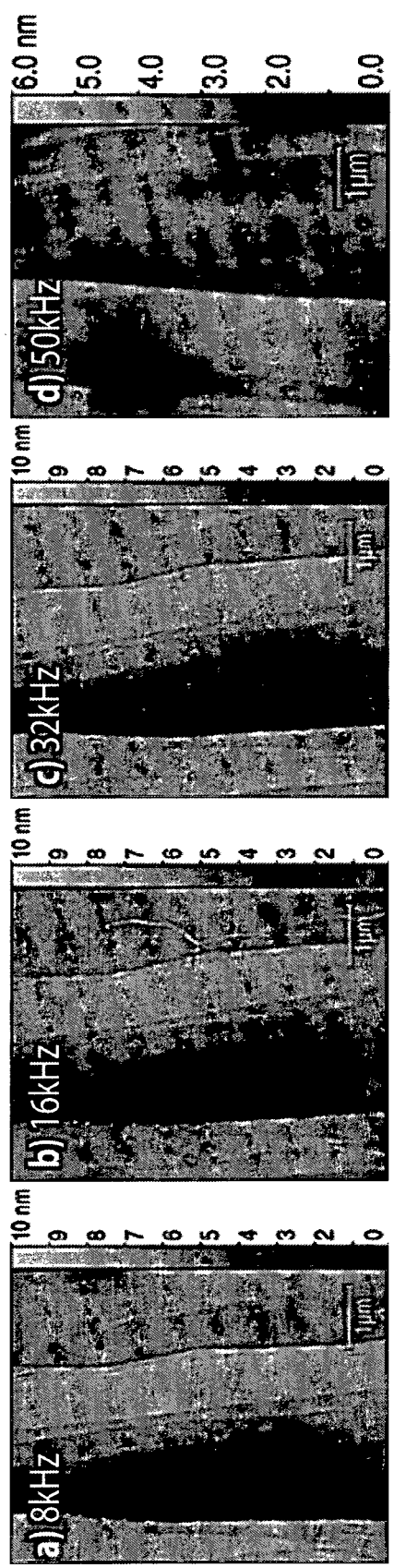
FIG. 14 contains a plurality of images comparing different Peak Force tapping rates with photothermal peak force tapping.

FIG. 14 shows PT-PFT images of HOPG at PF-rates up to 50 kHz, i.e., comparison of different Peak Force tapping rates with photothermal peak force tapping.

FIG. 14(a)-14(c): imaging at up to 32 kHz tapping rate in high quality images without loss in resolution;

FIG. 14(d): operation a very high rate (50 k taps/s) is possible, but limited by currently available controller hardware.

Figure 15:
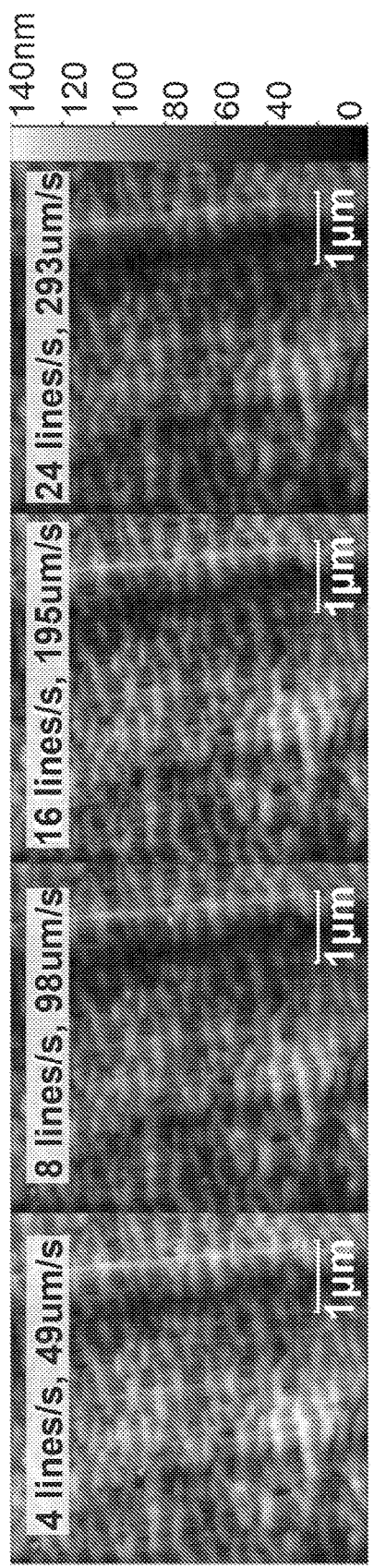
FIG. 15 contains PT-PFT images of Celgard 2400 in air and water at different scan rates.
Figure 15:
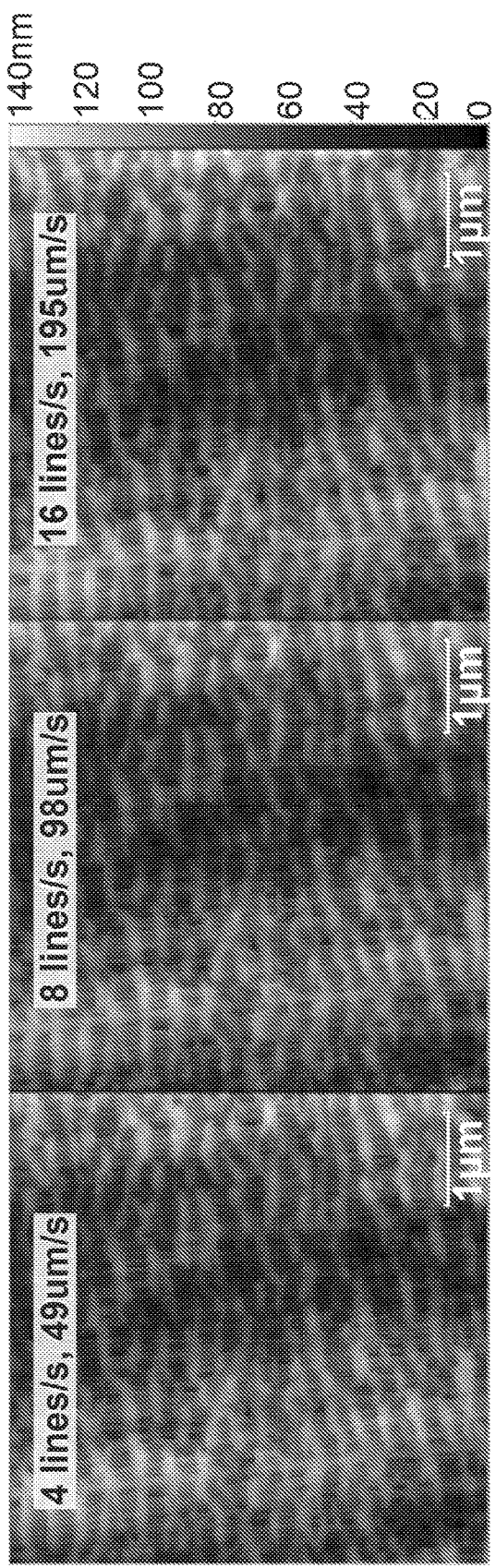

To demonstrate the improved speed performance through the use of PT-PFT we imaged Celgard 2400 membranes in air and water at different line-rates (surface speeds), see FIG. 15. The achievable surface speeds greatly exceed those possible with conventional PFT.

In FIG. 15, images in air were performed at 32 kHz peak force rate. Images in fluid were performed at 16 kHz peak force rate.

Other Embodiments

Instead of using a laser to heat and actuate the cantilever other direct cantilever actuation signals can be used, such as:
Piezoelectric[13],
Electrothermal[15,16],
Magnetic[17],
Electrostatic[18].

With respect to photothermal actuation, instead of using two lasers (one for detection and one for actuation) only one laser to perform both tasks can be used. Here the peak force actuation signal is used to modulate the intensity of the readout laser. This however also changes the intensity of the laser beam that hits the PSD. In this case it is essential to subtract the background of changing intensity. This may be done using a normalization of the deflection signal to the PSD output using a divider circuit as is commonly done in the art, or using a readout technique such as that described in reference[19] that provides a normalized signal output. The background subtraction could also be performed using the background generator and subtraction circuit described in FIG. 3 or a suitably adapted version thereof. The sensitivity of the optical deflection readout is maximized by placing the spot of the readout light beam at the distal end of the cantilever, while the photothermal actuation efficiency is maximized by placing the spot at the base of the cantilever. This method is preferably used when the size of the focused laser spot is comparable to the size of the cantilever. For optimizing performance over a wide range of cantilever sizes, additional optical elements may be placed in the optical path of the readout light beam that enables a modification of the size or shape of the focused laser spot to adapt to the cantilever size. This beam shaping can be accomplished, for example by stretching the shape of the laser spot along the length of the cantilever using cylindrical lens elements, or by splitting the readout light path such that a portion is directed towards the distal end of the cantilever and a portion of the light path is directed towards the base of the cantilever.

REFERENCES

1. Butt, H.-J., Cappella, B. & Kappl, M. Force measurements with the atomic force microscope: Technique, interpretation and applications. *Surf. Sci. Rep.* 59, 1-152 (2005).
2. Herruzo, E. T., Perrino, A. P. & Garcia, R. Fast nanomechanical spectroscopy of soft matter. *Nat. Commun.* 5, 3126 (2014).
3. Cappella, B. & Dietler, G. Force-distance curves by atomic force microscopy. *Surf. Sci. Rep.* 34, 1-104 (1999).
4. Rosa-Zeiser, A., Weilandt, E., Hild, S. & Marti, O. The simultaneous measurement of elastic, electrostatic and adhesive properties by scanning force microscopy: pulsed-force mode operation. *Meas. Sci. Technol.* 8, 1333-1338 (1997).
5. Pe, Â. & Garcô, R. *Dynamic atomic force microscopy methods.* 47, (2002).
6. Proksch, R. & Yablon, D. G. Loss tangent imaging: Theory and simulations of repulsive-mode tapping atomic force microscopy. *Appl. Phys. Lett.* 100, 2010-2013 (2012).
7. Lozano, J. & Garcia, R. Theory of phase spectroscopy in bimodal atomic force microscopy. *Phys. Rev. B* 79, 1-9 (2009).
8. Parlak, Z., Tu, Q. & Zauscher, S. Liquid contact resonance AFM: analytical models, experiments, and limitations. *Nanotechnology* 25, 445703 (2014).
9. Guo, S. et al. Multifrequency imaging in the intermittent contact mode of atomic force microscopy: Beyond phase imaging. *Small* 8, 1264-1269 (2012).
10. Platz, D., Forchheimer, D., Tholén, E. a & Haviland, D. B. Interaction imaging with amplitude-dependence force spectroscopy. *Nat. Commun.* 4, 1360 (2013).
11. Disseldorp, E. C. M. et al. MEMS-based high speed scanning probe microscopy. *Rev. Sci. Instrum.* 81, 043702 (2010).
12. Manalis, S. R., Minne, S. C. & Quate, C. F. Atomic force microscopy for high speed imaging using cantilevers with an integrated actuator and sensor. *Appl. Phys. Lett.* 68, 871 (1996).
13. Sulchek, T. et al. High-speed tapping mode imaging with active Q control for atomic force microscopy. *Appl. Phys. Lett.* 76, 1473 (2000).
14. Nievergelt, A. P., Adams, J. D., Odermatt, P. D. & Fantner, G. E. High-frequency multimodal atomic force microscopy. *Beilstein J. Nanotechnol.* 5, 2459-2467 (2014).
15. Fantner, G. E. et al. Use of self-actuating and self-sensing cantilevers for imaging biological samples in fluid. *Nanotechnology* 20, 434003 (2009).
16. Fantner, G. E., Burns, D. J., Belcher, A. M., Rangelow, I. W. & Youcef-Toumi, K. DMCMN: In Depth Characterization and Control of AFM Cantilevers With Integrated Sensing and Actuation. *J. Dyn. Syst. Meas. Control* 131, 061104 (2009).
17. Han, W., Lindsay, S. M. & Jing, T. A magnetically driven oscillating probe microscope for operation in liquids. *Appl. Phys. Lett.* 69, 4111 (1996).
18. Brugger, J., Blamf, N., Renaudb, P. & Rooija, N. F. De. Microlever with combined integrated sensor/actuator functions for scanning force microscopy. 43, 339-345 (1994).
19. Enning, R. et al. A high frequency sensor for optical beam deflection atomic force microscopy. *Rev. Sci. Instrum.* 82, 043705 (2011).

The invention claimed is:

1. A method for characterising a surface of a sample using atomic force microscopy with a cantilever acting as both actuator and sensor, the method comprising the steps of:
  generating an oscillating motion between a tip of the cantilever of the atomic force microscope and the surface of the sample by deforming at least a part of the cantilever to bring the tip of the cantilever in contact with the surface of the sample for a tip-sample interaction;
  recording a deflection of the cantilever resulting from the tip-sample interaction as a first signal;

extracting the tip-sample interaction as a second signal from the first signal by removing a background signal;

determining a peak force from the extracted second signal;

comparing the peak force to a predetermined setpoint force to determine an error signal;

generating a control signal from the error signal; and actuating a z-actuator using the control signal to maintain the peak force at the predetermined setpoint force, wherein the cantilever includes an actuation coating and a detection coating, each of the coatings made of a different material, and each of the coatings is arranged at a different location on the cantilever.

2. The method of claim 1, wherein the background signal includes a signal of the deflection resulting from the tip-sample interaction caused by the cantilever deformation to generate tip-sample distance modulation.

3. The method of claim 1, wherein the step of recording the cantilever signal includes a step of reading a light beam.

4. The method of claim 3, wherein the step of generating the oscillating motion caused by the deformation of at least a part of the cantilever uses a photothermal device as a modulation, and both a device generating the light beam and the photothermal device include a single laser.

5. The method of claim 1, wherein the step of generating the oscillating motion caused by the deformation of at least a part of the cantilever is performed by a modulation device configured to provide a deformation of an entirety of the cantilever.

6. The method of claim 1, wherein the step of generating the oscillating motion caused by the deformation of at least a part of the cantilever is performed by a modulation device configured to provide a partial deformation of the cantilever.

7. The method of claim 1, wherein the step of generating the oscillating motion caused by the deformation of at least a part of the cantilever is configured to achieve a predefined motion.

8. The method of claim 7, wherein the predefined motion compensates for the background signal.

9. The method of claim 1, further comprising the step of: thermally bending the cantilever to provide a feedback motion.

10. The method of claim 9, wherein the step of thermally bending is configured to enable the feedback motion using a combination of a piezo scanner and the bending of the cantilever.

11. An atomic force microscope configured to perform the method of claim 1.

12. The method of claim 1, wherein the detection coating is arranged at a free end of the cantilever, and the actuation coating is arranged at a base of the cantilever.

13. The method of claim 1, wherein the detection coating is arranged to cover an entire side of the cantilever.

14. The method of claim 1, wherein the step of recording is performed by strain sensing of the cantilever, and the detection coating includes a piezoresistive, electrothermal, or piezoelectric device.

* * * * *